(12) United States Patent
Frick

(10) Patent No.: US 6,619,893 B2
(45) Date of Patent: Sep. 16, 2003

(54) TAPPING APPARATUS

(75) Inventor: Ulrich Frick, Singen (DE)

(73) Assignee: Georg Fischer Wavin AG, Subinggen (CH)

( * ) Notice: Subject to any disclaimer, the term of this patent is extended or adjusted under 35 U.S.C. 154(b) by 42 days.

(21) Appl. No.: 09/934,745

(22) Filed: Aug. 22, 2001

(65) Prior Publication Data

US 2002/0051685 A1 May 2, 2002

(30) Foreign Application Priority Data

Aug. 25, 2000 (DE) .......................... 100 41 840

(51) Int. Cl.⁷ .............................................. B23B 41/08
(52) U.S. Cl. ...................... 408/92; 137/318; 408/101; 408/137
(58) Field of Search .................. 408/92, 101, 102, 408/137, 87, 138; 137/318

(56) References Cited

U.S. PATENT DOCUMENTS

| 2,296,651 A | * | 9/1942 | Mueller et al. | ............. 408/111 |
|---|---|---|---|---|
| 3,068,724 A | * | 12/1962 | Mueller | ....................... 137/318 |
| 4,902,174 A | * | 2/1990 | Thompson et al. | ......... 408/101 |
| 5,030,039 A | * | 7/1991 | Dove | .......................... 408/1 R |
| 5,058,620 A | * | 10/1991 | Jiles | ............................. 137/318 |
| 5,163,483 A | * | 11/1992 | Eckman | ......................... 141/1 |

FOREIGN PATENT DOCUMENTS

| DE | 1087430 | | 2/1961 | |
|---|---|---|---|---|
| DE | 1117971 | * | 11/1961 | .................. 408/110 |
| DE | 1899239 | | 8/1964 | |
| DE | 38 20 762 | | 2/1989 | |
| DE | 38 38 435 | | 5/1990 | |
| DE | 93 16 819 | | 3/1994 | |

* cited by examiner

Primary Examiner—Daniel W. Howell
(74) Attorney, Agent, or Firm—Bachman & LaPointe, P.C.

(57) ABSTRACT

A tapping apparatus having a drilling device for producing an outlet on a medium-carrying pipeline, on which a tapping fitting is arranged, and having a drive and advance device for driving and advancing a drilling tool is proposed, a coupling and uncoupling mechanism being arranged for coupling and uncoupling the drive device to and from the advance device for the drilling tool. The tapping apparatus is of modular construction, can be dismantled into individual parts and is easy to operate.

7 Claims, 4 Drawing Sheets

TAPPING APPARATUS

BACKGROUND OF THE INVENTION

The present invention relates to a tapping apparatus having a drilling device for producing an outlet on a medium-carrying pipeline, on which a tapping fitting is arranged, and having a drive and advance device for driving and advancing a drilling tool.

In pipeline construction, in particular in communal pipeline construction, the supply systems for water and gas are laid underground. In the districts which are built over with dwelling units, the main pipelines of the system are first laid along the main roads, and, depending on the advance of the superstructure, the secondary lines to the side roads and the service connections are connected as branches. For the operation of the main pipeline, it is advantageous that the main pipeline, after the construction of the branches, can remain in the operable state, that is to say carrying medium and under operating pressure. For smaller pipe diameters, tapping fittings in combination with outlet connecting pieces and valves and with simple tapping apparatuses which are to be used only once are known.

DE-A-38 38 435 discloses a tapping apparatus of the generic type for gas lines under pressure. The tapping apparatus consists of a universal drilling tool which is connected to a drill stem which is surrounded by a hollow shaft over its entire length. The hollow shaft is in turn surrounded by a multi-piece sleeve. The sleeve parts are screwed to one another and have different thread pitches. Individual sleeve parts can be coupled to the hollow shaft and the drill stem. The coupling functions with springs, tooth systems or friction linings. The different pitch enables different materials to be tapped with a single drilling tool. The use of this drilling apparatus in the case of pipelines under pressure requires the presence of a valve or a gate over the location to be tapped on the main pipeline. A wrench is necessary for driving the drill stem.

Accordingly, it is the principle object of the present invention to provide a tapping apparatus having a drilling device for producing an outlet on a medium-carrying pipeline, wherein the tapping apparatus is constructed such that it is especially easy to operate and can also be used with relatively large pipeline diameters.

SUMMARY OF THE INVENTION

The foregoing object is achieved by providing a tapping apparatus having a drilling device for producing an outlet on a medium-carrying pipeline, on which a tapping fitting is arranged, and having a drive and advance device for driving and advancing a drilling tool, a coupling and uncoupling mechanism being arranged for coupling and uncoupling the drive device to and from the advance device for the drilling tool.

It is advantageous that the tapping apparatus is as light as possible and has as far as possible small dimensions. The smaller the dimensions and the lighter the weight of the apparatus, the simpler it is to transport the apparatus from site to site. A tapping apparatus having a small overall length is advantageously used in trenches in which the main line has to be tapped laterally and branched off to the side. For the construction of the trench, excavating work, which is expensive and always leaves behind ugly traces on the road surface, can be saved. This is achieved by virtue of the fact that a base frame which can be detachably connected and is arranged essentially parallel to the pipeline is formed, an exchangeable and essentially cylindrical passage part, which can be connected to the tapping fitting, for the drilling tool being arranged between the base frame and the pipeline, and that a drill stem is provided for the interchangeable connection between the drilling tool and the drive and advance device. This is also achieved by the base frame being arranged such that it can be detachably connected to the pipeline by means of clamping straps, the base frame having a clamping device having a fine adjustment for the clamping straps.

It is also advantageous that the tapping apparatus can alternatively be used in pressureless pipelines and in pipelines under pressure. This is achieved by the exchangeable passage part being alternatively designed as a distance piece or as a shut-off device. This is also achieved by the shut-off device being designed as a ball valve or a slide.

It is also advantageous that the same tapping apparatus can be used in the case of pipeline diameters of different size. This is achieved owing to the fact that the tapping apparatus is of modular construction and in particular can be dismantled into individual parts, such as base frame, passage part, drill stem, drilling tool and drive and advance device, and can be transported as such.

BRIEF DESCRIPTION OF THE DRAWINGS

An exemplary embodiment of the invention is described with reference to the figures. In the drawing.

DETAILED DESCRIPTION OF THE PREFERRED EMBODIMENT(S)

Figure 1:
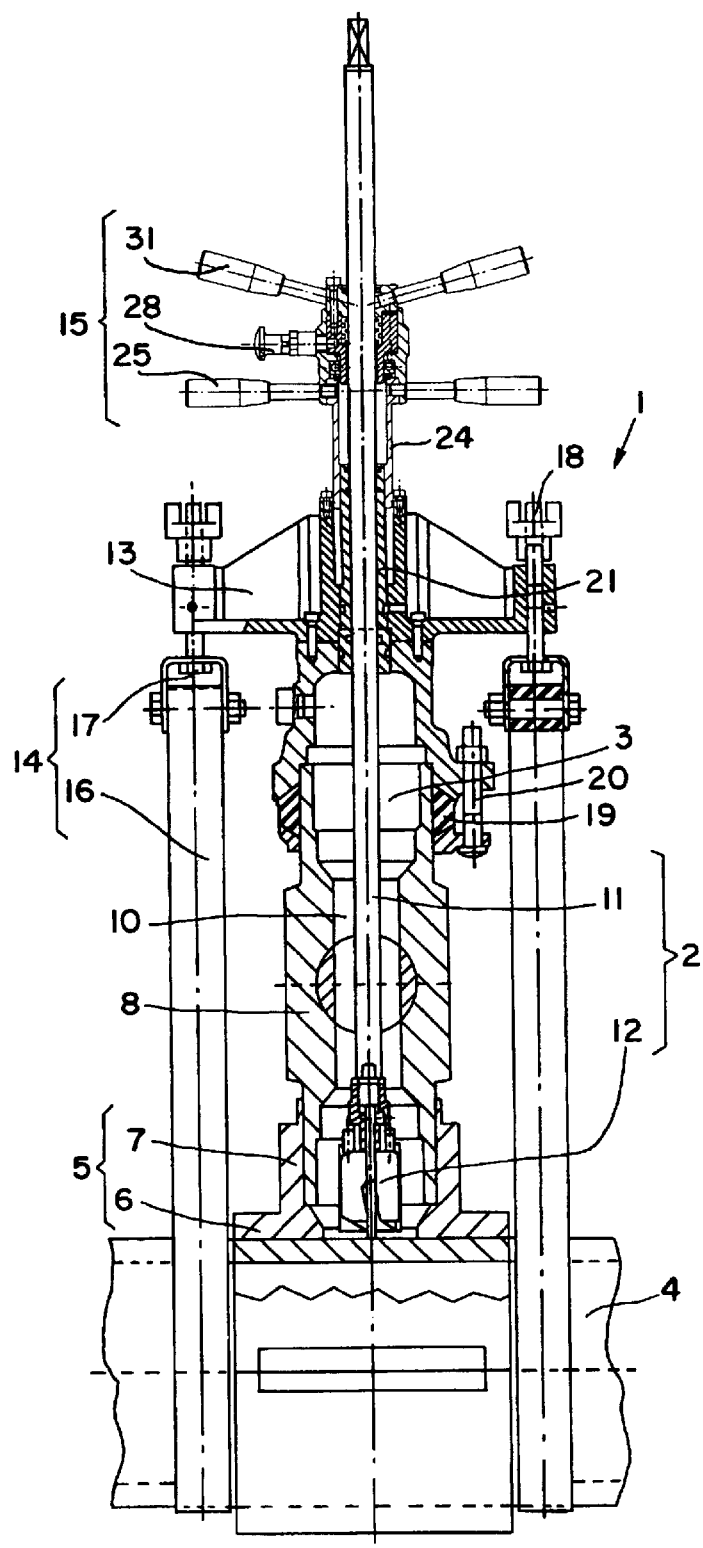
FIG. 1 shows a section through a tapping apparatus according to the invention.

A tapping apparatus 1 having a drilling device 2 for producing an outlet 3 on a medium-carrying pipeline 4 is shown sectioned in FIG. 1. It is assumed in FIG. 1 that the medium which is delivered in the main pipeline 4 has a pressure differing from the ambient. The main pipeline 4 may be a pressure line or a vacuum line. The medium may be liquid or gaseous. The main pipeline 4 is provided with a tapping fitting 5 at the location at which the outlet 3 is to be connected. The tapping fitting 5 consists of a saddle-shaped part 6, which fits like a saddle onto the outer circumference of the main pipeline 4, and of a connecting piece 7, which is connected in one piece to the saddle part 6 and leads away at an angle from the main pipeline 4. If the pipeline system is made of plastic, the saddle part 6 of the tapping fitting 5 can be connected to the main pipeline 4 by means of an electric welding joint. Before the tapping apparatus 1 is used, the tapping fitting 5 is connected to the main pipeline 4 in a medium-tight and pressure-resistant manner.

The tapping apparatus 1 is of modular construction and arrives on site dismantled into individual parts. If the main pipeline 4 is under pressure, first a ball valve 8 is inserted into the connecting piece 7. If the main pipeline 4 is pressureless during the tapping operation, a distance piece 9 (see FIG. 4), for example made of polyethylene or polypropylene, may also be used. The ball valve 8 or the distance piece 9 are brought as individual parts to the site where the tapping apparatus 1 is used. If the main pipeline 4 is under pressure, the shut-off device (ball valve) 8 remains connected to the main pipeline 4 after the tapping operation. If the main pipeline 4 is pressureless during the tapping opertaion, the distance piece 9 is removed from the connecting piece 7 after the tapping operation and is taken with the tapping apparatus 1 to the next workplace.

The connection between the connecting piece 7 and the shut-off device 8 may be produced by means of adhesive bonding, screwing or, like the connection between the saddle part 6 and the main pipeline 4, by means of an electric welding joint. During the tapping operation on a pipeline 4 under pressure, the ball valve 8 serves as a medium-tight passage part 10 for the drilling device 2. After the tapping operation, the drilling device 2 is carefully removed upward from the passage part 10, so that the shut-off device 8 can be closed.

The drilling device 2 essentially comprises a drill stem 11 and a drill tool 12. The drilling tool 12 is designed as a core drill and is detachably connected to the drill stem 11 via a thread.

Further essential individual parts into which the tapping apparatus 1 can be split are, from bottom to top: a base frame 13, a clamping device 14 and a drive and advance device 15. The clamping device 14 consists of clamping straps 16, which are easy to transport and can be placed around the main pipeline on site, and of a fastening 17 having a fine adjustment 18 with a thread.

The base frame 13 may be designed as a metal casting, which is arranged essentially parallel to the pipeline 4. Between the base frame 13 and the pipeline 4, the drill stem 11 runs through the cylindrical passage part 10, which in FIG. 1 is designed as a ball valve 8. During the tapping operation, the clamping straps 16 provide for the fastening of the tapping apparatus 1 to the main pipeline 4. The clamping straps 16 serve for the more coarse fixing and parallel orientation of the base frame 13. The fine adjustment 18 serves in particular for the desired precise orientation and guidance of the drilling device 2 during the drilling operation. If the drilling device 2 is not working in the desired direction, the fine adjustment 18 can also be actuated during the drilling operation for a more accurate adjustment. During the tapping operation, the base frame 13 is detachably connected to the passage part 10, here the ball valve 8, in the region of the outlet 3 by means of seals 19 and clamping screw 20. A cylindrical bearing sleeve 21 is also fastened in the base frame 13. The bearing sleeve 21 is arranged concentrically to the drill stem 11 in the base frame and serves to mount the drill stem 11 in the base frame 13.

Figure 2:
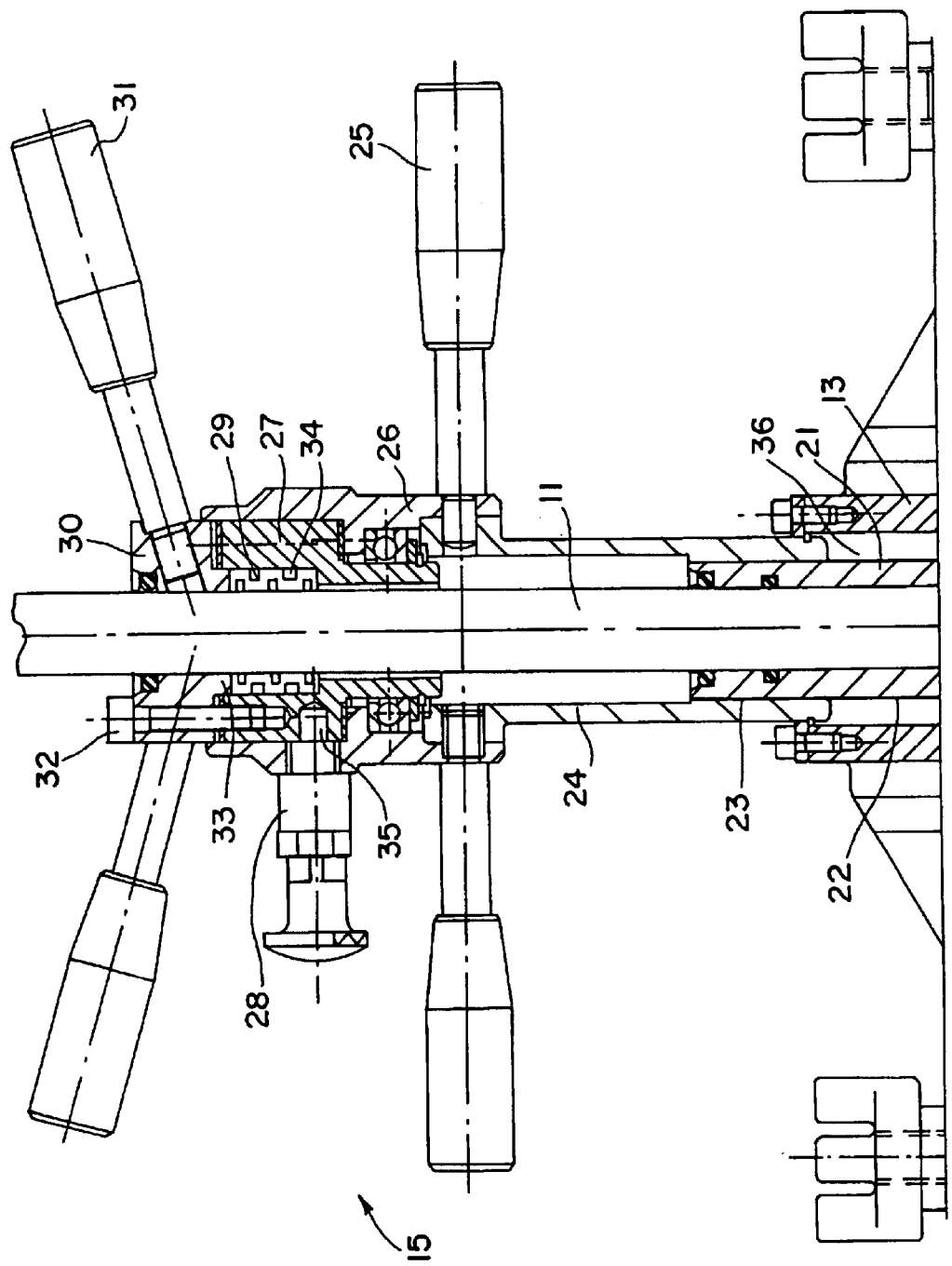
FIG. 2 shows an enlarged section through the drive and advance device of the tapping apparatus in FIG. 1.

As can be better seen in FIG. 2, which is an enlargement of the top part of FIG. 1, the bearing sleeve 21, on the side facing the drill stem 11, has a plurality of seals for sealing off the tapping apparatus 1 from the medium in the pipeline 4. On the outside, the bearing sleeve 21 has a first thread 22, which interacts with a second thread 23 which is formed on a cylindrical threaded bush 24. The cylindrical threaded bush 24 is a first essential part of the drive and advance device 15.

Furthermore, the drive and advance device 15 comprises the following essential parts: an advance lever 25, a locating part or receiving portion 26 of the threaded bush 24, a coupling bush 27, a coupling and uncoupling mechanism 28, a pressure sleeve 29, a pressure plate 30 and a drive lever 31. The drive lever or drive levers 31 are connected to the pressure plate 30. The pressure plate 30 together with the drive lever 31 is arranged concentrically around the drill stem 11. During assembly of the tapping apparatus 1, the pressure plate is pushed on at the top end of the drill stem 11 and can be fastened to the coupling bush 27 by means of screws 32.

The pressure plate 30 has an annular projection 33 which, when being screwed together with the coupling bush 27, engages in a likewise annular receptacle 34 of the coupling bush 27. Before assembly, the pressure sleeve 29 is inserted loosely into the receptacle 34 of the coupling bush 27. The pressure sleeve 29, in cross section, is of meander-shaped design or is designed like a bellows.

When the pressure plate 30 is being screwed together with the coupling bush 27, the special shape of the pressure sleeve 29 causes the pressure sleeve 29 to be elastically deformed and restrained in the receptacle 34 in such a way that the drill stem 11 is fixed in the coupling bush 27. The force which is exerted on the pressure sleeve 29 in the axial direction by the pressure plate 30 when the latter is being screwed together with the coupling bush 27 results in a force in the radial direction, this force acting on the drill stem 11 and on the coupling bush 27. When the pressure plate 30 is released, the pressure sleeve 29 springs back and the drill stem 11 can be displaced in the direction of the axis of the drill stem relative to the drive and advance device 15. This axial displacement is advantageous for a rapid feed or exchange of the drill stem 11 before or after the actual tapping step. The assembly of the drilling device 2 with the drive and advance device 15 is also further simplified by the elastic pressure sleeve 29 and by the detachable connection.

In the assembled state, the drill stem 11 is frictionally connected to the pressure sleeve 29, to the coupling bush 27, to the pressure plate 30 and to the drive lever 31. The rotary movement of the drive lever 31 results in a rotary movement of the drill stem 11 about the drill-stem axis. The drive lever 31, the pressure plate 30, the coupling bush 27 and the pressure sleeve 29 together essentially form the drive device.

However, the rotary movement of the drive lever 31 does not readily result in a movement in the direction of the drill-stem axis. To this end, the movement of the drive lever 31 must be coupled with the movement of the advance lever 25. The coupling and uncoupling mechanism 28, here shown as a latching pin 28, which can engage in a recess 35 of the coupling bush 27, serves to couple the two movements. The latching pin 28 is arranged such that it is movable in an elastic manner and can latch in place in the locating part 26 of the threaded bush 24.

When the latching pin 28 does not engage in the recess 35, the drive lever 31 and the advance lever 25 can be actuated independently of one another. The advance lever 25, the threaded bush 24 and the locating part 26, firmly connected thereto, of the threaded bush 24 together essentially form the advance device. On the inside, the threaded bush 24 has the second thread 23, which interacts with the first thread 22 of the bearing sleeve 21. By exchanging the bearing sleeve 21 and the threaded bush 24 for an appropriate combination having another pitch of the threads 22, 23, the tapping apparatus 1 can be adapted in a simple manner to pipeline materials of different hardness. The threaded bush 24 can be displaced on a helical line in an annular locating space 36 by actuating the advance lever 25, this locating space 36 being formed between the base frame 13, of cylindrical design in this region, and the top end of the cylindrical bearing sleeve 21. The annular locating space 36 also serves to improve the guidance of the drill stem 11.

Marks which indicate the advance of the threaded bush 24 with regard to the base frame 13 and thus also the advance of the drilling tool 12 with regard to the wall of the pipeline 4 can be made on the outside of the threaded bush 24.

When the latching pin 28 engages in the recess 35 of the coupling bush 27, the movements of the drive lever 31 and of the advance lever 25 are coupled to one another and the drill stem 11 and the drilling tool 12 move downward on a helical line into the material of the wall of the pipeline 4. If the resistance becomes too high during the tapping operation, the two movements of advance and drive can be uncoupled from one another by the latching pin 28 being unlatched in an elastic manner. The drive lever 31, which is then uncoupled from the advance lever 25, can then be actuated on its own. In the process, the resistance during the tapping becomes smaller, since the drilling tool 12 cuts into the material of the pipeline wall without advance.

Figure 3:
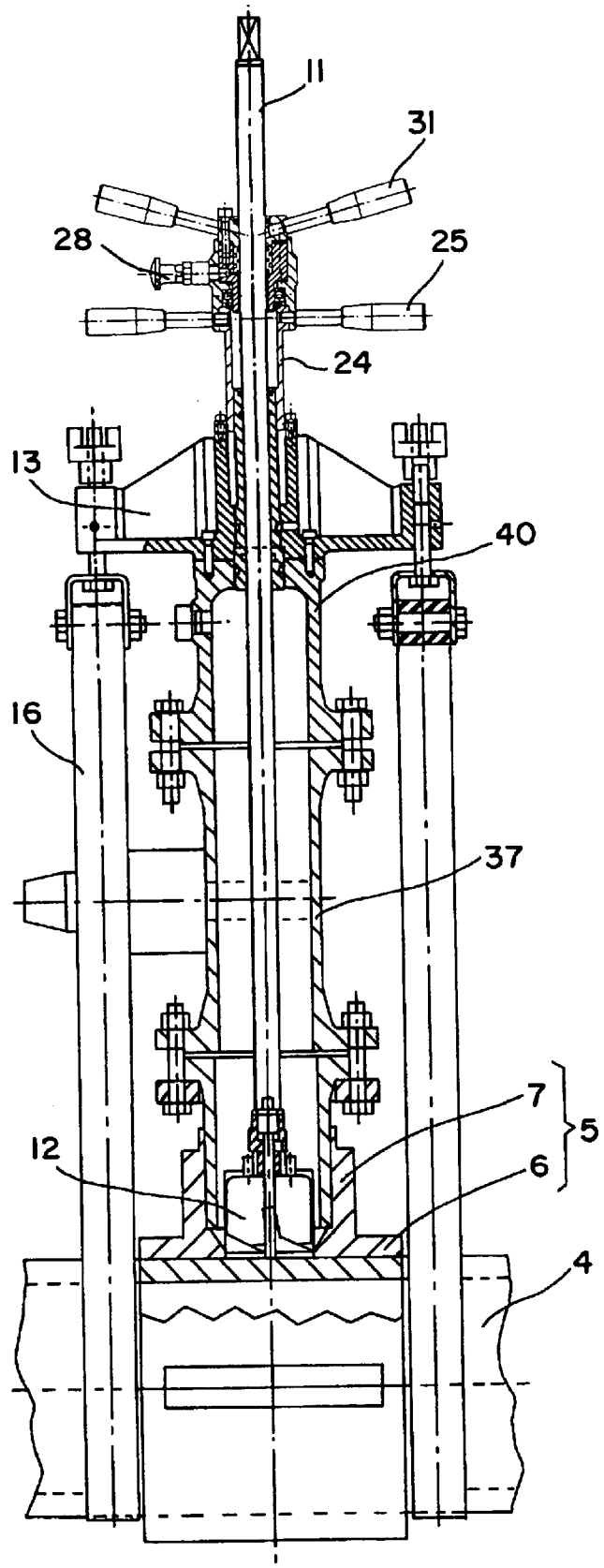
FIG. 3 shows a section through a second exemplary embodiment of a tapping apparatus.

An exemplary embodiment of the tapping apparatus 1 in FIG. 1 is shown in FIG. 3. The difference compared with FIG. 1 consists in the fact that the passage part 10 is designed as a flanged slide 37. Shown in FIG. 3 for the connection between the base frame 13 and the flanged slide 37 on the underside of the base frame 13 is an adapter bell 40 or a flanged bell which has a flange with screws on its underside, the screws being arranged in conformity with the flange pattern of the flanged slide 37. The tapping apparatus 1 can also be adapted for slides 37 of another type of construction and having other nominal diameters by exchanging the adapter bell 40.

Figure 4:
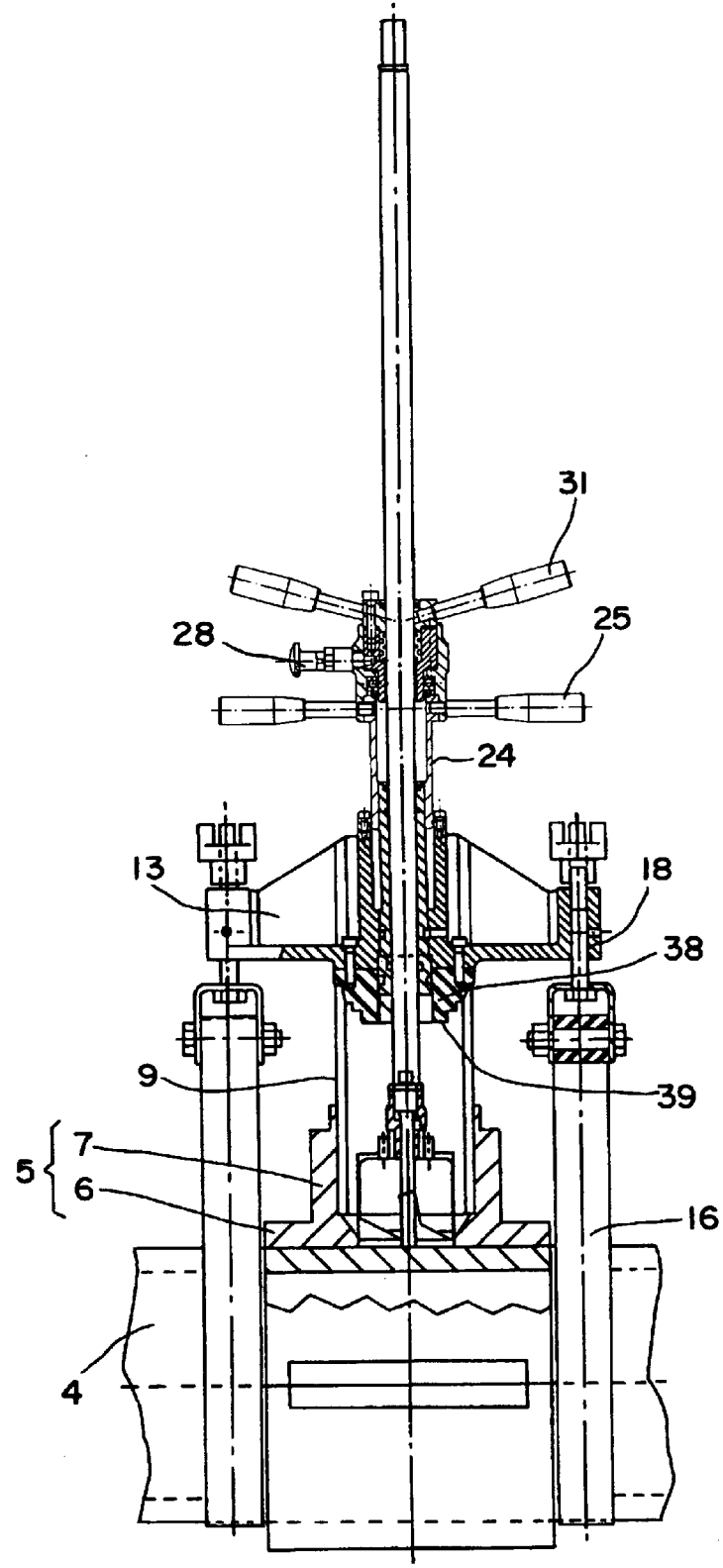
FIG. 4 shows a section through a third exemplary embodiment of a tapping apparatus.

A further exemplary embodiment of the tapping apparatus 1 in FIG. 1 is shown in FIG. 4. The FIG. 4, instead of a shut-off device, such as, for example, the flanged slide 37 in FIG. 3 or the ball valve 8 in FIG. 1, a simple distance piece 9 is shown. The exemplary embodiment in FIG. 4 is used in particular in pressureless pipelines 4. When pressureless pipelines are tapped, there is no risk of the medium escaping from the pipeline 4. After the tapping operation, the distance piece 9 is released from the tapping fitting 5 and belongs to the tapping apparatus 1. In order to be able to use the same base frame 13 with different diameters of the outlets 3, an adapter disk 38 is shown in FIG. 4, this adapter disk 38 having annular steps 39 on the side facing the pipeline 4. The steps 39 on the adapter disk 38 enable a multiplicity of distance pieces 9 having different nominal diameters to be connected with the same adapter disk 38 and the same base frame 13.

With the tapping apparatus 1 proposed here, it is possible to tap pipelines having relatively large diameters. The tapping apparatus 1 is adaptable and of modular construction and can be dismantled into individual parts. The individual parts are easy to transport and are simple to exchange for different individual parts which are required for other operating conditions. Due to the uncoupling of the two functions of advance and drive, a mode of operation which protects the material, both for the drilling tool 12 and for the material of the wall of the pipeline 4, is ensured.

What is claimed is:

1. A tapping apparatus comprising:
   a drilling device (2) including a drilling tool (12) for producing an outlet on a medium-carrying pipeline (4);
   a tapping fitting (5) arranged on the drilling device;
   means for driving and means for advancing the drilling tool;
   coupling means (28) for coupling and uncoupling the means for driving and the means for advancing;
   a base frame (13) detachably connected to and arranged essentially parallel to the pipeline, an essentially cylindrical passage part (10) connected to the tapping fitting (5) between the base frame and the pipeline, and wherein a drill stem (11) is provided for the connection between the drilling tool and the drive means (31) and advance means (25);
   a cylindrical bearing sleeve (21) for mounting the drill stem (11) is arranged in the base frame concentrically to the drilling device (2), the bearing sleeve having a first thread (22) on the outside;
   the drive means and advance means (15) has a medium-tight and cylindrical threaded bush (24) which is arranged concentrically to the drill stem (11) and is formed on the inside with a second thread (23) interacting with the first thread (22) in such a way that the drill stem (11) is arranged such that it is rotatable about the drill-stem axis and is displaceable in the direction of the axis with regard to the bearing sleeve (21) in the base frame (13); and
   the advance means of the drilling device comprises an advance lever (25) which is connected to a receiving portion (26) of the threaded bush (24), the receiving portion (26) receiving the drive device and the coupling and uncoupling mechanism (28).

2. The tapping apparatus as claimed in claim 1, wherein the drive means comprises a drive lever (31), a pressure plate (30), a pressure sleeve (29) and a coupling bush (27), the drive lever (31) being connected to the pressure plate (30) and arranged concentrically around the drill stem (11), the pressure plate (30) being arranged so as to be movable in the direction of the drill-stem axis and being arranged such that it can be connected to the coupling bush (27) by means of screws (32), the pressure sleeve (29) being deformed by the screwing of the pressure plate (30) to the coupling bush (27) in such a way that the drill stem (11) can be frictionally connected to the coupling bush (27) and to the drive lever (31), the coupling bush being mounted in the locating part (26) of the drive device, and the coupling bush having a recess (35) for accommodating the coupling and uncoupling mechanism (28).

3. The tapping apparatus as claimed in claim 1, wherein the passage part (10) is designed as one of a distance piece (9) and a shut-off device (8, 37).

4. The tapping apparatus as claimed in claim 3, wherein the shut-off device is designed as one of a ball valve (8) and a slide (37).

5. The tapping apparatus as claimed in claim 1, wherein the tapping apparatus is of modular construction and can be dismantled into individual parts, including a base frame (13), passage part (10), drill stem (11), drilling tool (12) and drive means and advance means (15).

6. The tapping apparatus as claimed in claim 1, wherein the base frame (13) is arranged such that it can be detachably connected to the pipeline (4) by means of clamping straps (16), the base frame (13) having a clamping device (17) having a fine adjustment (18) for the clamping straps (16).

7. A tapping apparatus comprising:
   a drilling device (2) including a drilling tool (12) for producing an outlet on a medium-carrying pipeline (4);
   a tapping fitting (5) arranged on the drilling device;
   means for driving and means for advancing the drilling tool;
   coupling means (28) for coupling and uncoupling the means for driving and the means for advancing;
   a base frame (13) detachably connected to and arranged essentially parallel to the pipeline, an essentially cylindrical passage part (10) connected to the tapping fitting (5) between the base frame and the pipeline, and wherein a drill stem (11) is provided for the connection between the drilling tool and the drive means (31) and advance means (25); and the base frame (13) is arranged such that it can be detachably connected to the pipeline (4) by means of clamping straps (16), the base frame (13) having a clamping device (17) having a fine adjustment (18) for the clamping straps (16).

\* \* \* \* \*